( 12 ) United States Patent
Morimoto (10) Patent No.: US 9,715,503 B2
(45) Date of Patent: Jul. 25, 2017

(54) PROGRAMMABLE DISPLAY DEVICE (71) Applicant: Digital Electronics Corporation, Osaka (JP)

(72) Inventor: Takeshi Morimoto, Osaka (JP)

(73) Assignee: Digital Electronics Corporation, Osaka-Shi (JP)

( * ) Notice: Subject to any disclaimer, the term of this patent is extended or adjusted under 35 U.S.C. 154(b) by 310 days.

(21) Appl. No.: 14/464,940

(22) Filed: Aug. 21, 2014

(65) Prior Publication Data

US 2015/0066924 A1 Mar. 5, 2015

(30) Foreign Application Priority Data

Aug. 27, 2013 (JP) .................................. 2013-176025

(51) Int. Cl.
G06F 17/30 (2006.01)
G06F 21/31 (2013.01)
G06F 21/44 (2013.01)
G06F 21/78 (2013.01)
G05B 19/05 (2006.01)
G06F 21/30 (2013.01)

(52) U.S. Cl.
CPC ....... G06F 17/30091 (2013.01); G05B 19/05 (2013.01); G06F 21/30 (2013.01); G06F 21/31 (2013.01); G06F 21/44 (2013.01); G06F 21/78 (2013.01); G05B 2219/1104 (2013.01)

(58) Field of Classification Search
USPC .................................................. 707/687–704
See application file for complete search history.

(56) References Cited

U.S. PATENT DOCUMENTS

| 6,141,730 | A | 10/2000 | Nishiumi et al. |
| 6,230,232 | B1 | 5/2001 | Nishiumi et al. |
| 2001/0010067 | A1 | 7/2001 | Nishiumi et al. |
| 2004/0123127 | A1 | 6/2004 | Teicher et al. |
| 2007/0079133 | A1 | 4/2007 | Hsieh |
| 2009/0073492 | A1* | 3/2009 | Okabe ................... G06F 21/572 |
| | | | 358/1.16 |
| 2009/0276845 | A1 | 11/2009 | Koara |

(Continued)

FOREIGN PATENT DOCUMENTS

JP 2007-226821 A 9/2007
JP 2008-033574 A 2/2008

(Continued)

OTHER PUBLICATIONS

Office Action of Corresponding JP application No. 2013-176025 mailed Jun. 23, 2015.

(Continued)

Primary Examiner — Hosain Alam
Assistant Examiner — Tuan-Khanh Phan
(74) Attorney, Agent, or Firm — Locke Lord LLP; Howard M. Gitten (57) ABSTRACT A programmable display device main body includes an address file detecting section for detecting whether a memory card stores a MAC address file, a password file detecting section for detecting whether the memory card stores a password file, and an activation control section for reading data from the memory card. The activation control section does not read data in a case where the memory card stores neither a MAC address file nor a password file.

6 Claims, 2 Drawing Sheets (56) References Cited

U.S. PATENT DOCUMENTS

2012/0219152 A1* 8/2012 Yorifuji .................. H04L 9/083
 380/277
2013/0086659 A1  4/2013 Tsuji et al.

FOREIGN PATENT DOCUMENTS

| JP | 2009-181238 | 8/2009 |
| JP | 2010-061429 | 3/2010 |
| JP | 2012-216222 A | 11/2012 |
| JP | 5085778 B1 | 11/2012 |
| WO | WO-2008/084631 A1 | 7/2008 |

OTHER PUBLICATIONS

European search report issued Jan. 16, 2015 for corresponding EPC patent application No. 14181474.9.

* cited by examiner

FIG. 1

PROGRAMMABLE DISPLAY DEVICE

This Nonprovisional application claims priority under 35 U.S.C. §119 on Patent Application No. 2013-176025 filed in Japan on Aug. 27, 2013, the entire contents of which are hereby incorporated by reference.

TECHNICAL FIELD

The present invention relates to a programmable display device that stores data on a detachable external storage medium.

BACKGROUND ART

A programmable display device includes a display section for displaying an image, a touch panel for a touch input, an interface for communication with a device connected to the programmable display device, and a control section for controlling the above sections. Such a programmable display device has (i) a function of indicating an operating condition of a device in the form of an image displayed by the display section and (ii) a function of receiving, at the touch panel on the display section, an operational input for providing a control instruction to the device.

A programmable display device, which in general has a graphical display function, is capable of displaying an image prepared in advance to include a switch, an indicator lamp, a meter and the like, and thus serves as an operating terminal in a control system. In such a control system, it is the programmable display device provided near each device that displays an operating condition and the like of the device and that provides a control instruction to the device.

A programmable display device typically stores data on images to be displayed with use of a graphical display function on a flash memory (such as a flash erasable and programmable ROM) built in the programmable display device, such a flash memory being not easily detachable.

Thus, in a case where a user wants to use the same or similar image data at a plurality of programmable display devices (that is, the user wants to copy the image data), there has been a need for the user to transfer data via a device other than those programmable display devices. For instance, there has been a need for the user to take a procedure of uploading image data stored on a programmable display device to a device other than the programmable display device with use of dedicated software and then downloading the uploaded image data to another programmable display device with use of the same software.

A programmable display device may, instead of taking the above procedure, alternatively be arranged to store image data on a detachable external storage medium for ease of copying the image data and using the image data at another device. This arrangement makes it possible to (i) detach an external storage medium from a programmable display device and attach the external storage medium to another device or to (ii) easily copy image data stored on an external storage medium onto a general-purpose computer or the like. The above arrangement, however, involves the risk of a third party, other than the user, taking away the external storage medium or copying image data on the external storage medium for unauthorized use.

To limit access to data obtained in an unauthorized manner as described above, there has been developed a technique for placing a limit on which device is permitted to use the data. Patent Literature 1, for example, discloses a technique of (i) storing a device setting file together with data on each of a plurality of storage mediums which device setting file contains the MAC address of a terminal and the serial number of the storage medium in association with each other and (ii) in a case where the terminal reads out the data, referring to the device setting file on the basis of the MAC address of the terminal.

Patent Literature 2 discloses a technique of (i) storing, on a recording device, a file encrypted with use of a cryptographic key on the basis of the unique identifier of an electronic information device and (ii) in a case where the encrypted file is read out from the recording device, decoding the file with use of a cryptographic key regenerated from the unique identifier of a device reading out the file.

CITATION LIST

Patent Literature 1
Japanese Patent Application Publication, Tokukai, No. 2010-061429 A (Publication Date: Mar. 18, 2010)
Patent Literature 2
Japanese Patent Application Publication, Tokukai, No. 2009-181238 A (Publication Date: Aug. 13, 2009)

SUMMARY OF INVENTION

Technical Problem

Assuming that the technique disclosed in Patent Literature 1 is adopted in a programmable display device having the above arrangement, even in a case where a user is permitted to access an external storage medium and copies the memory contents of the external storage medium onto another external storage medium, the user will unfortunately be unable to access that other external storage medium. Thus, the above assumed arrangement, which can prevent illegal copying of the memory contents of an external storage medium, will result in a limited access to even image data copied in an authorized manner (as intended by the user).

The technique disclosed in Patent Literature 2 not only places a limit on which programmable display device is permitted to read image data, that is, prevents use of image data obtained or copied in an unauthorized manner (against the user's intention), but also unfortunately limits access to image data copied in an authorized manner (as intended by the user). In other words, the technique of Patent Literature 2 will force a programmable display device arranged as above to lose the advantages brought by that arrangement.

The present invention has been accomplished in view of the above problems. It is an object of the present invention to provide a programmable display device capable of being freely set so that (i) a user is prohibited from using data stored on the programmable display device at another device (that is, a user is permitted to use data stored on the programmable display device only at that dedicated device), (ii) a user is permitted to use data stored on the programmable display device at any other device as well, or (iii) only a regular user is permitted to use data stored on the programmable display device at another device if so intended.

Solution to Problem

In order to solve the above problems, a programmable display device of the present invention is a programmable display device including: a programmable display device main body having a self-identifier as an identifier unique to the programmable display device main body; and an external storage medium attachable to and detachable from the programmable display device main body, the external storage medium storing data to be read by the programmable display device main body and further storing at least one of (i) an identifier-storing file containing a record identifier associated with the data and (ii) a setting-information-storing file capable of containing setting information associated with the data, the programmable display device main body including: an identifier-storing-file detecting section for detecting whether the external storage medium stores the identifier-storing file; a setting-information-storing-file detecting section for detecting whether the external storage medium stores the setting-information-storing file; and a data reading section for reading the data, the data reading section not reading the data in a case where the external storage medium stores neither the identifier-storing file nor the setting-information-storing file.

Advantageous Effects of Invention

The present invention advantageously provides a programmable display device capable of being freely set so that (i) a user is prohibited from using data stored on the programmable display device at another device (that is, a user is permitted to use data stored on the programmable display device only at that dedicated device), (ii) a user is permitted to use data stored on the programmable display device at any other device as well, or (Hi) only a regular user is permitted to use data stored on the programmable display device at another device if so intended.

DESCRIPTION OF EMBODIMENTS

One embodiment of the present invention is described below.

Figure 1:
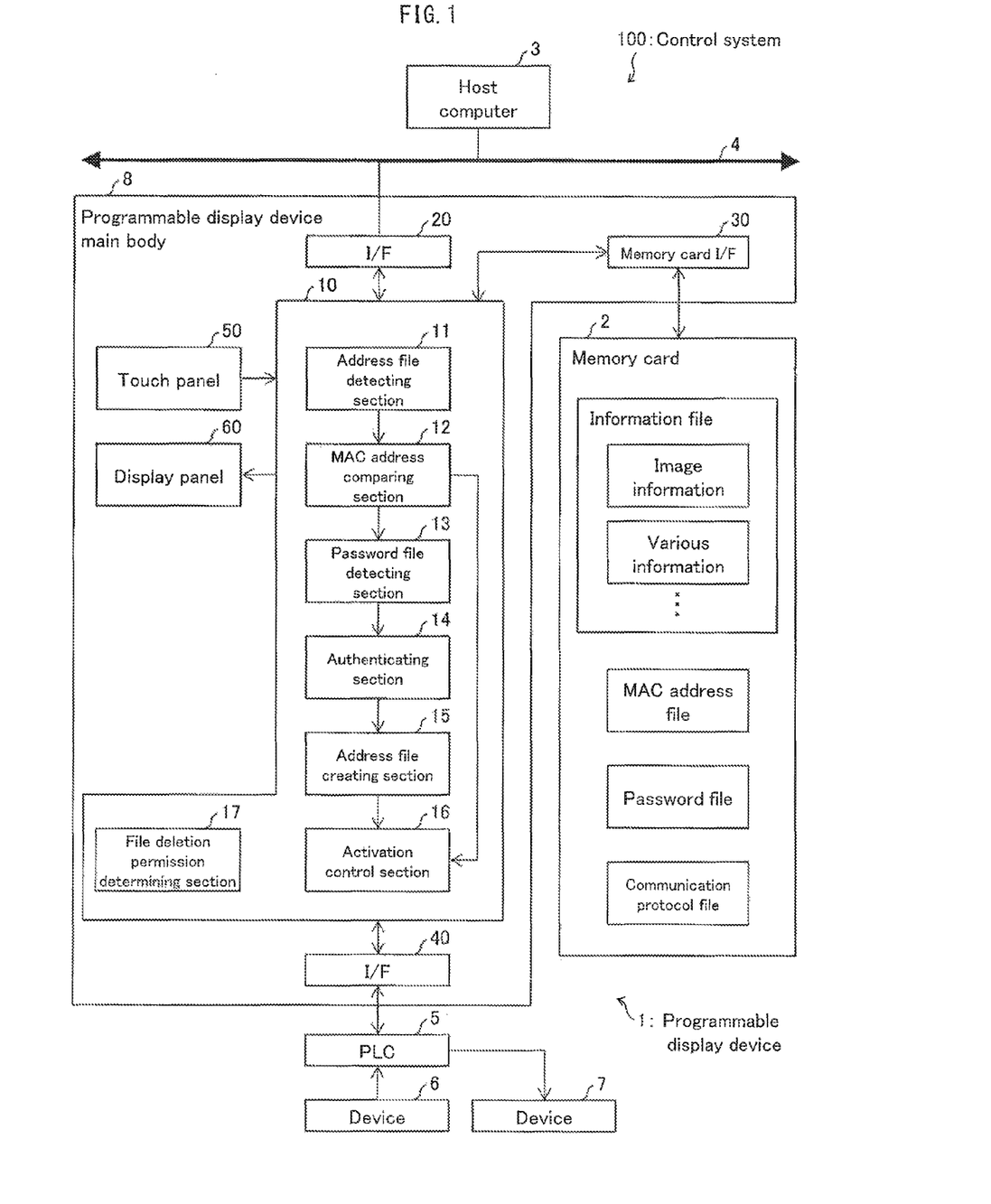
FIG. 1 is a block diagram illustrating a configuration of a control system including a programmable display device of one embodiment of the present invention.

With reference to FIG. 1, the description below first deals with an overall arrangement of a control system 100 including a programmable display device 1 of the present embodiment, FIG. 1 is a block diagram illustrating a configuration of a control system 100 including a programmable display device 1 of one embodiment of the present invention.

The control system 100, as illustrated in FIG. 1, includes a programmable display device 1 and a host computer 3 connected to the programmable display device 1 over a network 4. The control system 100 further includes a programmable logic controller 5 (hereinafter referred to as "PLC 5") connected to the programmable display device 1, a source device 6 connected to the PLC 5, and a destination device 7 connected to the PLC 5. The programmable display device 1 includes a programmable display device main body 8 and a memory card 2 (external storage medium) removably connected to the programmable display device main body 8. The programmable display device main body 8 will be described later in detail. FIG. 1 simply shows "device 6" to indicate the source device 6 and "device 7" to indicate the destination device 7.

The control system 100 is arranged, for instance, to (i) transmit to the PLC 5 via the programmable display device 1 control data transmitted from the host computer 3 and (ii) transmit to the host computer 3 via the programmable display device 1 various data generated at the PLC 5. The host computer 3 transmits to the programmable display device 1 control data to be supplied to the PLC 5, and receives from the programmable display device 1 various data collected by and stored in the programmable display device 1. The network 4 of the control system 100 is a local area network (LAN), such as Ethernet (registered trademark), which enables communication based on a common communication protocol, or another communication network including the Internet.

The host computer 3 creates or stores (manages) control data to be supplied to the PLC 5, and also manages various data received from the programmable display device 1.

The PLC 5 captures the state of the source device 6 and transmits data on the state to the programmable display device 1. The PLC 5 also receives from the programmable display device 1 a control instruction to be provided to the destination device 7, and transmits the control instruction to the destination device 7.

The source device 6 transmits data on its state to the PLC 5, and is specifically a sensor (such as a temperature sensor and an optical sensor) or a switch, for example. The destination device 7 functions in accordance with a control instruction received from the PLC 5, and is specifically an actuator, a relay, a solenoid valve, or a display device, for example. Such source devices 6 and destination devices 7 are provided at necessary positions of any of various target systems such as a production line.

The memory card 2 is a storage medium that stores various data for use by the programmable display device 1 and that is detachable from a device to which it is attached. The memory card 2 is, for example, an SD card (registered trademark). The memory card 2, more specifically, stores an information file and a communication protocol file. The memory card 2 may further store a MAC address file and/or a password file.

The information file contains various information including image data (image information) created, information on the programmable display device 1, font information, and other setting information, and specifies the operation of the programmable display device 1. The information file contains data on at least one image.

The image data is data on an image for one frame to be displayed by the programmable display device 1. The information file is normally constituted by a collection of a series of pieces of image data corresponding to, for example, the control system 100 or a product produced by the control system 100. The information file is created with use of graphics software installed on a general-purpose computer, and is downloaded from the general-purpose computer to the memory card 2 connected to the programmable display device 1 via the programmable display device 1.

The MAC address file (identifier-storing file) contains a MAC address of a device (self-identifier unique to the device) capable of reading an information file. A later description will deal in detail with how to determine whether a device is capable of reading an information file. A device is, however, capable of reading an information file at least in a case where the MAC address of the programmable display device main body 8 matches the MAC address contained in the MAC address file. The memory card 2 may not store a MAC address file as described later in detail.

The password file (setting-information-storing file), in a case where a password has been set (entered or automatically created) on the programmable display device 1, contains that password. The memory card 2 may not store a password file as described later in detail. Further, as described later in detail, there may be a case where although the memory card 2 stores a password file, that password file does not contain a password (for example, a case where a password was not set on the programmable display device 1).

The communication protocol file contains information including a communication protocol corresponding to the manufacturer and model of the PLC 5 which communication protocol is complied with by the programmable display device 1 and the PLC 5 for a serial communication. The communication protocol file is read out through an interface (I/F) 40. The communication protocol is defined in the communication protocol file.

The programmable display device 1, as described above, serves as a human-machine interface of the control system 100 for a unique operational function and display function.

The programmable display device 1, to carry out the above function, includes a control section 10, an I/F 20, a memory card I/F 30, an I/F 40, a touch panel 50, and a display panel 60. Specifically, the programmable display device main body 8 contains, in a housing thereof (not shown), the control section 10, the I/F 20, the memory card I/F 30, and the I/F 40, and is provided with the touch panel 50 and the display panel 60 such that they are exposed at a front surface of the housing. The description below deals in detail with the individual sections included in the programmable display device 1.

The I/F 20 controls communication between the programmable display device 1 and the host computer 3, and is connected to the network 4.

The memory card I/F 30 is a reader/writer for writing data to and reading data from the memory card 2.

The I/F 40 controls communication between the programmable display device 1 and the PLC 5.

The touch panel 50 receives a touch input on a display surface of the display panel 60. The touch panel 50 can suitably adopt any of various methods such as matrix switch, resistor film method, surface acoustic wave method, infrared radiation method, electromagnetic induction method, and capacitance method.

The display panel 60 serves as a display section for displaying an image under control by the control section 10. The display panel 60 is suitably a liquid crystal panel, an organic EL panel, a plasma display panel or the like for a thin programmable display device 1.

The control section 10 serves to carry out an operational function and display function. The control section 10 further controls activation of the programmable display device 1 in correspondence with (i) whether the MAC address file and password file described above are present or absent and (ii) what is contained in each file. The control section 10, to carry out this activation control function, includes an address file detecting section 11, a MAC address comparing section 12, a password file detecting section 13, an authenticating section 14, an address file creating section 15, an activation control section 16, and a file deletion permission determining section 17.

The address file detecting section 11 (identifier-storing-file detecting section) detects whether the memory card 2 stores a MAC address file.

The MAC address comparing section 12 (identifier matching determining section), in a case where the memory card. 2 stores a MAC address file, compares the MAC address of the programmable display device main body 8 with the MAC address contained in the MAC address file.

The password file detecting section 13 (setting-information-storing-file detecting section) detects whether the memory card 2 stores a password file.

The authenticating section 14 (setting information detecting section, authenticating section), in a case where the memory card 2 stores a password file, detects whether the password file contains a password. Further, the authenticating section 14, in a case where the password file contains a password, carries out password authentication on the basis of the password contained.

The address file creating section 15 (identifier-storing-file creating section), in a case where (i) the password authentication by the authenticating section 14 has been successful or (ii) the password file does not contain a password, newly creates a MAC address file on the memory card 2, and in a case where the memory card 2 already stores a MAC address file, overwrites the existing MAC address file with the newly created MAC address file.

The activation control section 16 (data reading section), in a case where the comparison by the MAC address comparing section 12 of the two MAC addresses has determined that the two MAC addresses are identical to each other or (ii) the address file creating section 15 has newly created a MAC address file, activates the programmable display device 1.

The file deletion permission determining section 17 serves to avoid a situation in which the memory card 2 stores neither a MAC address file nor a password file. To meet this purpose, the file deletion permission determining section 17, (i) in a case where the memory card 2 stores only either a MAC address file or a password file, prohibits deletion of that existing file and (ii) in a case where the memory card 2 stores both a MAC address file and a password file, permits deletion of only one of the two files.

The description below now deals with how the programmable display device 1 operates in the control system 100 arranged as described above.

The programmable display device 1 is arranged such that the control section 10 reads out an information file from the memory card 2 to an image memory or the like (not shown) and carries out a display process based on image data contained in the information file. The image data includes process-specifying information that specifies various processes related to, for example, an input operation and display operation. The control section 10, on the basis of such image data, determines how to, for example, display the state of the source device 6 and how to control the state of the source device 6 in accordance with an input operation.

The control section 10 further carries out its communication function for communication with the PLC 5 to obtain data on the state of each source device 6 which data is stored in a memory of the PLC 5, and causes the display panel 60 to display the state of each source device 6. In a case where the PLC 5 is a model for a serial communication, the I/F 40 reads out a communication protocol file from the memory card 2, and communicates with the PLC 5 in accordance with the communication protocol indicated in the communication protocol file. In a case where the PLC 5 is a model for a network communication, the I/F 40 controls that network communication.

Further, the control section 10 carries out its communication function to transmit data such as a control instruction to the PLC 5 in response to an input operation on the touch panel 50. The control section 10 further communicates with the host computer 3 over the network 4 for data transmission between the host computer 3 and itself. During this operation, the I/F 20 controls the network communication carried out between the programmable display device 1 and the host computer 3 on the basis of IP addresses.

The description below now deals with the flow of a data authentication process carried out by the programmable display device 1 of the present embodiment. The term "data authentication process" as used herein refers to a process of (i) determining whether the memory card 2 stores an information file that has been downloaded to the programmable display device 1 with use of graphics software and that is dedicated to that programmable display device 1, an information file dedicated to another programmable display device 1, an information file available to all programmable display devices 1, or an information file that is available to other programmable display devices 1 as long as the correct password has been entered, and (ii) depending on the result of the determination, activating the programmable display device 1 (reading the information file) or not activating the programmable display device 1.

Figure 2:
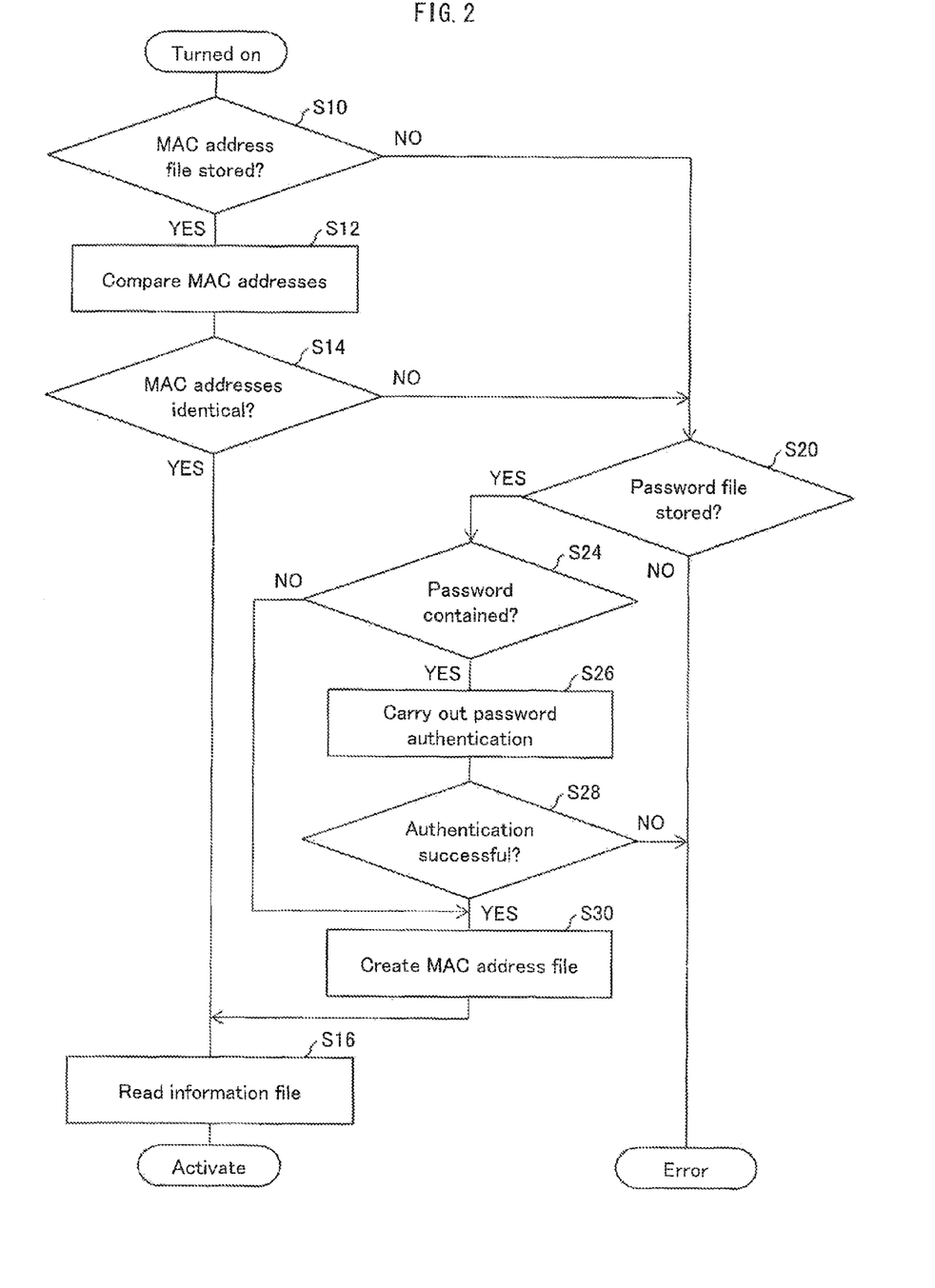
FIG. 2 is a flowchart illustrating an example process carried out by the programmable display device included in the control system.

The description below deals with the flow of a data authentication process with reference to FIG. 2. FIG. 2 is a flowchart illustrating the flow of a data authentication process carried out by the programmable display device 1.

In a case where the programmable display device 1 has been turned on, the address file detecting section 11 of the control section 10 detects a memory card 2 connected to the programmable display device main body 8 via the memory card I/F 30. After detecting a memory card 2, the address file detecting section 11 determines whether the memory card 2 stores a MAC address file (S10).

In a case where the address file detecting section 11 has determined that the memory card 2 stores a MAC address file (YES in S10), the address file detecting section 11 reads out that MAC address file from the memory card 2 and transmits the MAC address file to the MAC address comparing section 12.

The MAC address file should desirably be encrypted so that the MAC address contained in the file is unrecognizable as such. Further, the MAC address file itself should desirably be so stored on the memory card 2 as to have, for example, a name and format that do not allow intuitive recognition that it is a file that contains a MAC address.

The MAC address comparing section 12, upon receipt of the MAC address file, reads out the MAC address contained in the MAC address file and compares the MAC address of the programmable display device main body 8 with the MAC address contained in the MAC address file (S12).

In a case where the comparison shows that the two MAC addresses are identical to each other (YES in S14), the information file associated with the MAC address file on the memory card 2 must be data downloaded from graphics software through the programmable display device main body 8, that is, data created for the programmable display device main body 8 to which the memory card 2 is attached. The activation control section 16, as a result, reads out the information file from the memory card 2 (S16) to activate the programmable display device 1.

In a case where (1) the memory card 2 does not store a MAC address file (NO in S10) or (ii) the comparison shows that the MAC address of the programmable display device main body 8 is not identical to the MAC address contained in the MAC address file (NO in S14), the information file cannot be data usable in the programmable display device main body 8 to which the memory card 2 is attached. In this case, the password file detecting section 13 of the control section 10 determines whether the memory card 2 stores a password file (S20).

In a case where the memory card 2 does not store a password file (NO in S20), the activation control section. 16 does not read out the information file, and thus does not activate the programmable display device 1.

In a case where the memory card 2 stores a password file (YES in S20), the password file detecting section 13 reads out the password file from the memory card 2 and transmits the password file to the authenticating section 14. The authenticating section. 14, upon receipt of the password file, determines whether the password file contains a password (S24).

The password contained in the password file may have any form that allow authentication of the user at the programmable display device 1, and may be used in any authentication method that allow authentication of the user at the programmable display device 1. The form and authentication method are thus not particularly limited. Further, the password file may contain, instead of a password that has been set by the user, a password that has been automatically created by graphics software or the programmable display device main body 8.

In a case where the password file does not contain a password (NO in S24), the address file creating section 15 creates on the memory card 2 a MAC address file containing the MAC address obtained from the programmable display device main body 8 (S30). The activation control section 16 then reads out the information file from the memory card 2 to activate the programmable display device 1.

In other words, assuming that the memory card 2 stores a password file and that password file does not contain a password, even in a case where the MAC address of the programmable display device main body 8 is not identical to the MAC address contained in the MAC address file, the address file creating section 15 newly creates a MAC address file and as necessary overwrites the existing MAC address file with the newly created MAC address file for activation of the programmable display device 1. This means that in a case where a memory card 2 stores a password file and that password file does not contain a password, that memory card 2 is usable for any programmable display device 1.

In a case where the password file contains a password (YES in S24), the authenticating section 14 carries out password authentication on the basis of the password contained (S26).

In a case where the password authentication has been successful (YES in S28), it may mean that a user who knows the password is trying to use the memory card 2 at another programmable display device 1. Even in such a case, the address file creating section 15 creates a MAC address file (S30), and then the activation control section 16 reads out the information file from the memory card 2 to activate the programmable display device 1.

In a case where the password authentication by the authenticating section 14 has been unsuccessful (NO in S28), it may mean that the user is trying to use in an unauthorized manner a memory card 2 dedicated to another device, and the activation control section 16 thus does not read the information file.

The above data authentication process allows the programmable display device 1 to determine as follows: In a case where a memory card 2 stores a password file and that password file does not contain a password while the MAC address file contains a MAC address of a device other than the programmable display device main body 8 in use, it means that the user has arranged the information file stored on the memory card 2 so that the information file is usable for another programmable display device main body 8 as well. In a case where the MAC address of the programmable display device main body 8 is not identical to the MAC address contained in the MAC address file stored on a memory card 2 but the password authentication has been successful, it means that the user is trying to use, at the programmable display device main body 8 with the memory card 2 attached, an information file dedicated to another programmable display device main body 8.

With the above process carried out, a memory card 2 that stores a MAC address file but does not store a password file is one dedicated to a desired programmable display device 1.

Further, in a case where a memory card 2 stores a password file and that password file does not contain a password, the information file on that memory card 2 is readable at a programmable display device main body 8 even in a case where (i) the memory card 2 does not store a MAC address file or (ii) the MAC address of the programmable display device main body 8 is not identical to the MAC address contained in the MAC address file. In other words, an information file may be arranged to be readable at any programmable display device main body 8. Even in a case where a memory card 2, stores a password file and that password file contains a password, a user who knows the password (regular user) can cause another programmable display device main body 8 to read the information file. In addition, the above process can also prohibit reading data obtained in an unauthorized manner.

In a case where a memory card 2 stores neither a MAC address file nor a password file, the information file on that memory card 2 is unreadable by any programmable display device 1. This is, however, a normally impossible case unless the user has deleted the password file. This is because a memory card 2 in its initial state (when shipped from a factory) does not store a MAC address file but does store a password file without a password. A memory card 2 is handled as a product paired with a programmable display device main body 8, and is shipped from a factory as packaged with a programmable display device main body 8.

Attaching the memory card 2 in the above state to the programmable display device main body 8 and turning on the programmable display device main body 8 causes a MAC address file to be newly created. After a MAC address file has been created, (i) deleting the password file causes the information file on the memory card 2 to be dedicated to that programmable display device main body 8, (ii) not setting a password causes the information file on the memory card 2 to be usable at any other programmable display device main body 8 as well, and (iii) setting a password causes the information file on the memory card 2 to be usable at other programmable display devices main body 8 as well, as long as the user knows the password (that is, the user is a regular user).

In a case where after a MAC address file has been created, the password file has been deleted as described above, and the MAC address file created has also been deleted, the memory card 2 will store neither a password file nor a MAC address file as described above. To avoid such a situation, the file deletion permission determining section 17, in a case where it detects an operation to delete the MAC address file on a memory card 2 while the memory card 2 does not store a password file, prohibits the deletion of the MAC address file. A memory card 2, when shipped from a factory, stores a password file and does not store a MAC address file, in a case where the file deletion permission determining section 17 detects an operation to delete the password file on a memory card 2 in the above state, the file deletion permission determining section 17 prohibits the deletion of the password file. The file deletion permission determining section 17 may be arranged to sound an alarm instead of prohibiting deletion of a file.

As described above, the present embodiment allows the user to (i) designate data as data dedicated to a device, that is, a programmable display device main body 8, and (ii) designate a programmable display device 1 as the only device that is activated with use of the data. In this case, unauthorized copying of data and unauthorized use of a memory card will be meaningless in a case where there is no need to prevent unauthorized copying of data or unauthorized use of a memory card, the present embodiment allows the user to designate data as data available to any user at any programmable display device main body 8. Further, the present embodiment allows the user to designate data as data available to any regular user (that is, any user who knows the password) at any programmable display device main body 8. This arrangement makes it possible to effectively prevent, for example, unauthorized data copying by a user who does not know the password.

The information file and the record identifier (that is, the MAC address contained in the MAC address file) be associated with each other in any of various manners. The information file and the record identifier can be associated with each other in the easiest manner in a case where they are stored on a single memory card as in the present embodiment.

[Software Implementation Example]

Control blocks of the programmable display device 1 (particularly, the control section 10) may be realized by a logic circuit (hardware) provided in an integrated circuit (IC chip) or the like, or may be realized by software as executed by a central processing unit (CPU).

In the latter case, the programmable display device 1 includes a CPU that executes instructions of a program that is software realizing the foregoing functions, a read only memory (ROM) or storage device (each referred to as "storage medium") storing the program and various kinds of data in such a form that they are readable by a computer (or a CPU), and a random access memory (RAM) that develops the program in executable form. The object of the present invention can be achieved by a computer (or a CPU) reading and executing the program stored in the storage medium.

The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program.

Note that the present invention can also be implemented by the program in the form of a computer data signal embedded in a carrier wave which is embodied by electronic transmission.

The present invention is not limited to the description of the embodiment above, but may be altered in various ways by a skilled person within the scope of the claims. Any embodiment based on a proper combination of technical means disclosed in the embodiment is also encompassed in the technical scope of the present invention.

The programmable display device of the present embodiment can also be described as below.

The programmable display device of the present embodiment is a programmable display device including: a programmable display device main body having a self-identifier as an identifier unique to the programmable display device main body; and an external storage medium attachable to and detachable from the programmable display device main body, the external storage medium storing data to be read by the programmable display device main body and further storing at least one of (i) an identifier-storing file containing a record identifier associated with the data and (ii) a setting-information-storing file capable of containing setting information associated with the data, the programmable display device main body including: an identifier-storing-file detecting section for detecting whether the external storage medium stores the identifier-storing file; a setting-information-storing-file detecting section for detecting whether the external storage medium stores the setting-information-storing file; and a data reading section for reading the data, the data reading section not reading the data in a case where the external storage medium stores neither the identifier-storing file nor the setting-information-storing file.

With the above arrangement, in a case where the external storage medium stores neither the identifier-storing file nor the setting-information-storing file, the data is not read from the external storage medium. In this case, the user is unable to handle the data as data dedicated to the programmable display device main body.

The programmable display device may be arranged such that the programmable display device main body further includes an identifier matching determining section for detecting whether, in a case where the external storage medium stores the identifier-storing file, the self-identifier is identical to the record identifier; and the data reading section (i) does not read the data in a case where the self-identifier is not identical to the record identifier and the external storage medium does not store the setting-information-storing file, and (ii) reads the data in a case where the self-identifier is identical to the record identifier.

With the above arrangement, in a case where the self-identifier is not identical to the record identifier and the external storage medium does not store the setting-information-storing file, the data is not read from the external storage medium this case, as well as the above case where the external storage medium stores neither the identifier-storing file nor the setting-information-storing file, the user is unable to handle the data as data dedicated to the programmable display device main body in a case where the self-identifier is identical to the record identifier, the user is able to read data from the external storage medium and handle the data as data dedicated to the programmable display device main body.

The programmable display device may be arranged such that the programmable display device main body further includes: a setting information detecting section for, in a case where the external storage medium stores the setting-information-storing file, detecting whether the setting-information-storing file contains the setting information; and an identifier-storing-file creating section for, in a case where the external storage medium stores the setting-information-storing file and the setting-information-storing file does not contain the setting information, (i) creating an identifier-storing file containing the self-identifier of the programmable display device main body as the record identifier and (ii) writing the created identifier-storing file to the external storage medium; and the data reading section reads the data in the case where the external storage medium stores the setting-information-storing file and the setting-information-storing file does not contain the setting information.

With the above arrangement, in a case where the setting-information-storing file does not contain the setting information, the identifier-storing-file creating section creates an identifier-storing file. This allows a regular user to be free from a limit that is placed with use of setting information on data use and select unrestricted use of read data. Further, after an identifier-storing file has been created, the regular user can, with use of a self-identifier in the identifier-storing file, handle, as data dedicated to the programmable display device main body, data stored on the external storage medium.

The programmable display device may be arranged such that the programmable display device main body further includes an authenticating section for, in a case where the setting-information-storing file contains the setting information, carrying out authentication on a basis of the setting information; the identifier-storing-file creating section, in a case where the authentication has been successful, (i) creates an identifier-storing file containing the self-identifier of the programmable display device main body as the record identifier and (ii) writes the created identifier-storing file to the external storage medium; and the data reading section reads the data in the case where the authentication has been successful.

With the above arrangement, in a case where the setting-information-storing file contains setting information, the identifier-storing-file creating section creates an identifier-storing file if authentication based on the setting information has been successful. This allows a regular user, who knows the setting information, to freely use read data through authentication based on the setting information. Further, in a case where the setting information has been deleted, a user can then, with use of a self-identifier in the created identifier-storing file, handle, as data dedicated to the programmable display device main body, data stored on the external storage medium.

INDUSTRIAL APPLICABILITY

The present invention is suitably applicable for use to determine whether data is readable at a programmable display device that stores data on a detachable external storage medium.

REFERENCE SIGNS LIST 1 programmable display device
2 memory card (external storage medium)
8 programmable display device main body
11 address file detecting section (identifier-storing-file detecting section)
12 MAC address comparing section (identifier matching determining section)
13 password file detecting section setting-information-storing-file detecting section)
14 authenticating section (setting information detecting section, authenticating section)
15 address file creating section (identifier-storing-file creating section)
16 activation control section (data reading section)

The invention claimed is:
1. A programmable display device, comprising:
a programmable display device main body having a self-identifier as an identifier unique to the programmable display device main body; and
an external storage medium attachable to and detachable from the programmable display device main body,
the external storage medium storing data to be read by the programmable display device main body and further storing at least one of (i) an identifier-storing file containing a record identifier that is associated with the data and that is indicative of the self-identifier and (ii) a setting-information-storing file capable of containing setting information that is associated with the data and that is for use in authentication of the data, the programmable display device main body including:

an identifier-storing-file detecting section for detecting whether an external storage medium storing the data and connected to the programmable display device main body stores the identifier-storing file;

a setting-information-storing-file detecting section for detecting whether the external storage medium connected to the programmable display device main body stores the setting-information-storing file; and a data reading section for reading the data, the data reading section not reading the data in a case where the external storage medium connected to the programmable display device main body stores neither the identifier-storing file nor the setting-information-storing file, and a setting information detecting section for, in a case where the external storage medium connected to the programmable display device main body stores the setting-information-storing file, detecting whether the setting-information-storing file contains the setting information; and an identifier-storing-file creating section for, in a case where the external storage medium connected to the programmable display device main body stores the setting-information-storing file and the setting-information-storing file does not contain the setting information, (i) creating an identifier-storing file containing the self-identifier of the programmable display device main body as the record identifier and (ii) writing the created identifier-storing file to the external storage medium connected to the programmable display device main body.

2. The programmable display device according to claim 1, wherein:

the programmable display device main body further includes an identifier matching determining section for detecting whether, in a case where the external storage medium connected to the programmable display device main body stores the identifier-storing file, the self-identifier is identical to the record identifier; and the data reading section (i) does not read the data in a case where the self-identifier is not identical to the record identifier and the external storage medium connected to the programmable display device main body does not store the setting-information-storing file, and (ii) reads the data in a case where the self-identifier is identical to the record identifier.

3. The programmable display device according to claim 1, wherein:

the data reading section reads the data in the case where the external storage medium connected to the programmable display device main body stores the setting-information-storing file and the setting-information-storing file does not contain the setting information.

4. The programmable display device according to claim 3, wherein:

the programmable display device main body further includes an authenticating section for, in a case where the setting-information-storing file contains the setting information, carrying out authentication on a basis of the setting information;

the identifier-storing-file creating section, in a case where the authentication has been successful, (i) creates an identifier-storing file containing the self-identifier of the programmable display device main body as the record identifier and (ii) writes the created identifier-storing file to the external storage medium connected to the programmable display device main body; and the data reading section reads the data in the case where the authentication has been successful.

5. The programmable display device according to claim 2, wherein:

the programmable display device main body further includes:

a setting information detecting section for, in a case where the external storage medium connected to the programmable display device main body stores the setting-information-storing file, detecting whether the setting-information-storing file contains the setting information; and an identifier-storing-file creating section for, in a case where the external storage medium connected to the programmable display device main body stores the setting-information-storing file and the setting-information-storing file does not contain the setting information, (i) creating an identifier-storing file containing the self-identifier of the programmable display device main body as the record identifier and (ii) writing the created identifier-storing file to the external storage medium connected to the programmable display device main body; and the data reading section reads the data in the case where the external storage medium connected to the programmable display device main body stores the setting-information-storing file and the setting-information-storing file does not contain the setting information.

6. The programmable display device according to claim 5, wherein:

the programmable display device main body further includes an authenticating section for, in a case where the setting-information-storing file contains the setting information, carrying out authentication on a basis of the setting information;

the identifier-storing-file creating section, in a case where the authentication has been successful, (i) creates an identifier-storing file containing the self-identifier of the programmable display device main body as the record identifier and (ii) writes the created identifier-storing file to the external storage medium connected to the programmable display device main body; and the data reading section reads the data in the case where the authentication has been successful.

* * * * *